May 28, 1935.  C. B. DE VLIEG  2,002,991
BACKLASH REMOVER
Original Filed Nov. 1, 1928
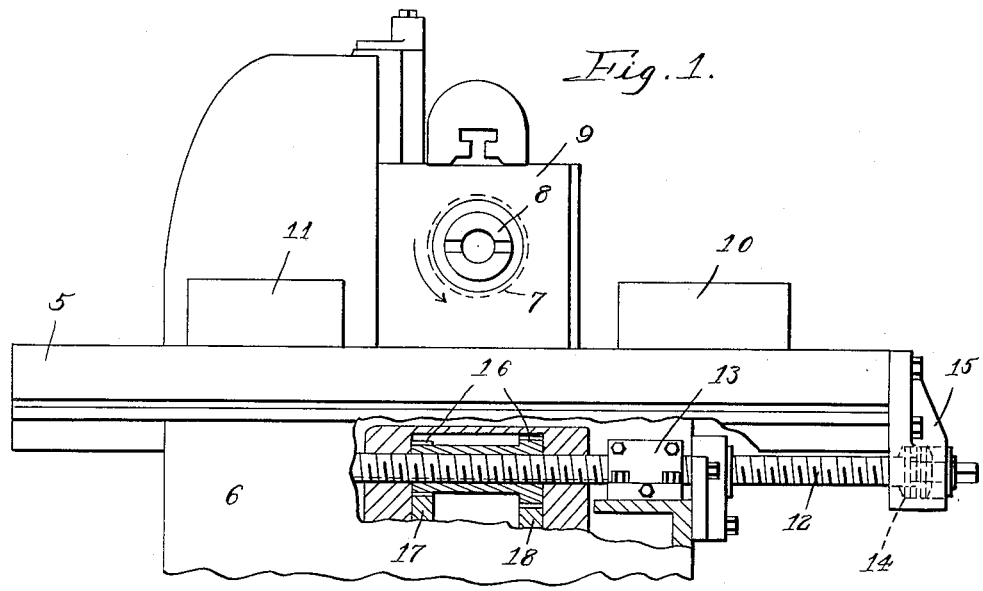
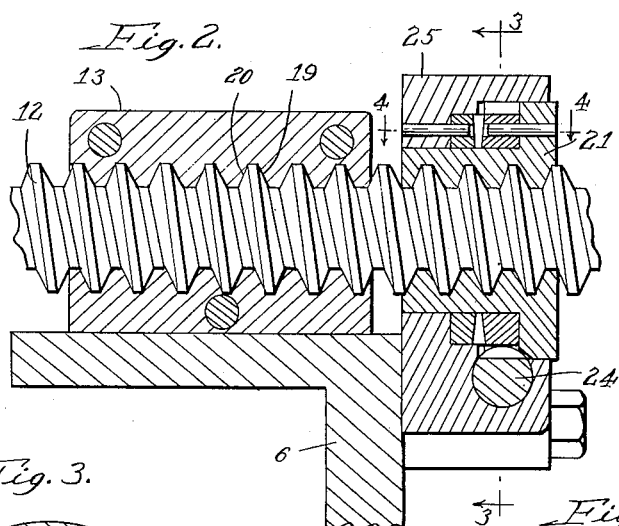
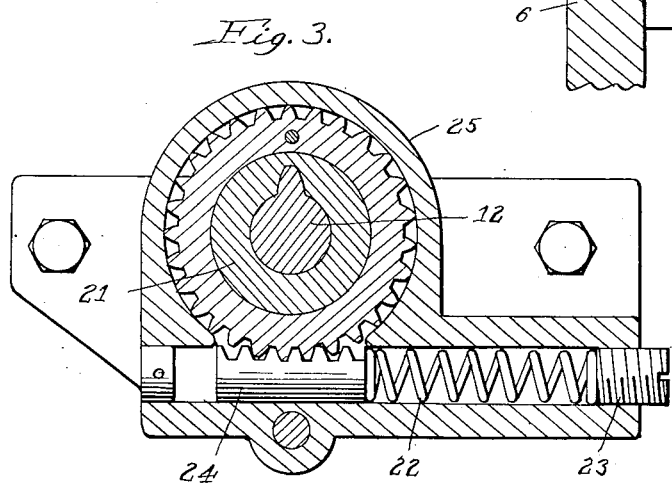
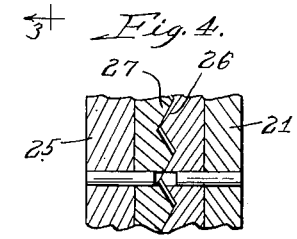
Inventor:
Charles B. De Vlieg
By
Wilson + McCanna
Attys.

Patented May 28, 1935

2,002,991

UNITED STATES PATENT OFFICE 2,002,991

BACKLASH REMOVER

Charles B. De Vlieg, Jackson, Mich., assignor to Associated Patents, Inc., Cincinnati, Ohio, a corporation of Ohio Refiled for abandoned application Serial No. 316,504, November 1, 1928. This application October 31, 1932, Serial No. 640,561

19 Claims. (Cl. 90—22)

This is a substitute for my application for back lash remover filed November 1, 1928, Serial No. 316,504.

The object of this invention is to provide a back lash remover in connection with a screw and nut feed wherever applicable.

The invention is also an improvement in machine tools for removing or eliminating back lash in connection with the table movement, the object being to provide a solid abutment against which the cutting load thrust is taken under conditions such as are illustrated herein.

In the present case my invention when applied to a milling machine provides for the removal or elimination of back lash in the table feed when the direction of cutting is reversed from normal cutting for performing what is known as "climb cutting". Climb cutting occurs when the work piece is fed into the cutter in the same direction as the travel of the cutter teeth. Under such condition without my invention the result would be a more or less intermittent feed with the work piece feeding into the cutter until the cutter tooth took an excessive and usually destructive thickness of chip which would advance the table to the end of any back lash between the feed screw and the nut. This not only produces defective milling but is destructive of the cutter and the mechanism in general. My invention provides a table movement that will be positive and without back lash at all times, so that it is possible to mill with a feed operating in each direction and the cutter rotating in one direction or in either of the two directions of rotation.

Heretofore, machines have been designed to avoid the conditions producing the objections and disadvantages noted but, so far as I am aware, they comprise more or less complicated mechanisms which are objectionable both because of the additional cost and the lack of rigidity and accuracy due to the many wearing parts, also because they cannot be operated in both directions of rotation of the screw or nut driving element as the case may be, or because they have a transitory interval or period of inoperativeness to perform the function of this invention. The present invention is, therefore, not only of general application to screw and nut feeds, but is an improvement in the art of milling machines for the reason that it allows conventional cutting in one direction and climb cutting in the reverse direction of travel of the work table without the disadvantages heretofore experienced.

I have also aimed to provide a simple and practical back lash remover embodying a new mode of operation adapted for application to any machine tool having a screw and a nut feed.

Other objects and attendant advantages will be appreciated by those skilled in this art as the invention becomes better understood by reference to the following description when considered in connection with the accompanying drawing, in which—

Figure 1 is a front elevation partly in vertical section of a milling machine to which my invention is applied;

Fig. 2 is an enlarged vertical section through the screw and nut table feed mechanism and parts in which my improvements are centered;

Fig. 3 is a cross-section taken substantially on the line 3—3 of Fig. 2, and

Fig. 4 is a fragmentary section taken substantially on the line 4—4 of Fig. 2.

My invention may be applied to any screw and nut feed where the problem is to provide a positive table or carriage movement without back lash under all conditions of operation. In the present illustration, my invention is applied to a case wherein the feed is in opposite directions and the cutting thrust is in a single direction. In this case, the invention is applied to a milling machine having a work table 5 mounted for reciprocation on the bed 6 and a milling cutter 7 attached to a spindle 8 which in turn is mounted for rotation on a horizontal axis in a head 9. Suitable mechanism (not shown) rotates the cutter spindle in a counter-clockwise direction only. The cutter is adapted to mill work pieces 10 and 11 at both ends of the table by feed of the table in opposite directions. With my invention the table movement will be positive and without the troubles incidental to back lash, as will be presently apparent. It is not necessary, of course, that the cutter shall operate upon two work pieces, since in some cases the cutting may be in opposite directions on a single work piece, or at a single station for climb cutting only.

The cutter preferably rotates continuously in the direction indicated while the machine is in operation. The table is propelled by a screw 12 which operates in a nut 13 fixed to the bed 6. The screw has a suitable anti-friction thrust bearing connection at 14 in an arm 15 fixed to one end of the table. By rotating the screw in opposite directions as by means of a double gear 16 having a key spline connection with screw and suitable drive gears 17 and 18, the table will be fed back and forth, the screw translating with the table.

Referring now to Fig. 2, it will be apparent that when the screw is rotated to feed the work piece 10 to the left into the cutter, the thrust of the screw thread is against the side 19 of the thread of the fixed nut 13. The thrust is against the same side of the thread both when the table is being propelled in this direction as for rapid traverse to the cutter and when carrying the full load of the cutter resistance when feeding. This is the normal milling operation and is common practice in most milling machines. The load is directly against the side 19 of the nut thread, and because of the well known wedge-like cutting action of the cutter teeth, the feed is positive and without back lash troubles. However, as soon as the direction of the table is reversed with a machine of this kind prior to my invention the thrust of the screw in propelling the table is transferred against the side 20 of the nut thread, and as soon as the work piece 11 is fed into the cutter (rotating in the same direction as in the case of said normal milling) a different cutting action takes place commonly termed "climb cutting" in which the cutter exerts a force throwing the screw thread against the opposite face 19 of the fixed nut thread to the extent of the existing play or clearance between these parts. Such play or back lash, however small, in the screw and the nut connection will have a decidedly objectionable effect on the cutting and a destructive effect on the cutter. The tendency of each cutter tooth will be to take an excessive and usually destructive bite or thickness of chip and to advance the table to the end of the back lash. This produces an intermittent, irregular, jumping feed as is well known in this art.

My invention overcomes the objections noted by the provision of means for exerting a force against the screw to always cause its thread to bear against the side 19 of the fixed nut thread, thus removing any play or back lash and providing a solid abutment at all times for the thrust of the screw. This is accomplished in the present instance by the provision of a supplemental nut 21 on the screw and suitable means for causing the nut to exert said force in a common direction against the screw when the latter is rotated in either direction. Said means in this embodiment comprises a coiled spring 22 compressed between a normally fixed but adjustable abutment 23 and a rack member 24 meshing with teeth on the periphery of the supplemental nut 21. The parts 21, 22, 23 and 24 are mounted in a suitable housing 25 fixed with respect to the bed of the machine. The supplemental nut has a serrated face 26 in the nature of multiple cams engaging a similarly serrated face 27 fixed to the housing 25. It will be seen that the spring-operated rack causes the supplemental nut to turn in a clockwise direction viewing Fig. 3 to cause the screw to bear against the side 19 and thread of the fixed nut. There is also a cam action of the nut cam face 26 against the fixed cam face 27. The effect of this construction is to produce a spring-operated wedge forcing the screw against the desired side of the fixed nut in a semi-solid manner without excessive spring pressure on the screw itself and still such as will yield to variance in the pitch diameter of the screw as well as to variance caused by wear. This force against the screw is greater than the load of moving the table in the rapid traverse or feed thereof to the right to bring the work piece 11 to the cutter, with the result that the supplemental nut serves to maintain the screw against the side 19 of the fixed nut when climb cut feeding, traversing or rapid approaching the table to the right. Consequently, when the cutter enters the work piece there is no back lash and in fact the load or thrust is at all times against a solid abutment, that is, the side 19 of the fixed nut. When feeding in this direction the force of the cutter against the work piece by reason of the climb cutting is so great as to tend to force the table and the screw ahead. In other words, the table propelling force is derived from the cutter rather than from the screw. As a result of this action the screw thread is forced against the side 19 of the fixed nut, the screw serving merely as a metering medium regulating the feed. Thus the screw has a solid abutment against the fixed nut at all times and especially during the reverse feed, thereby resisting the climbing tendency of the cutter and permitting it to take only its normal thickness of chip.

The removal of back lash in this manner also serves to permit climb cutting in either direction with a single piece of work and a cutter rotation of either direction. It also permits the use of two sets of cutters mounted on the spindle set up for opposite directions of cutting action. This is desirable with two work pieces in staggered position relative to the cutter location and by means of a reversing spindle drive the pronounced advantage of climb cutting on each work piece is obtained. In this instance the abutment for the cutting thrust in one direction is taken against the side of the screw indicated at 19, and in the opposite direction on the auxiliary nut against the outside of the thread shown at 20.

One of the features of my invention exemplified in the embodiment herein illustrated is the use of means serving as a pressure wedge constantly exerting pressure axially between the nut elements, the angle of the wedge serving to cause one of the nut elements to constantly take up wear of the threads in both nuts and yield to irregularities of the screw thread, yet provide sufficient thrust between the motion transmitting elements to maintain the screw thread against a common side of the nut thread for either direction of motion transmission. This feature of my invention is, I believe, distinctly new and is applicable to screw and nut transmissions wherever used. It is particularly advantageous and desirable for the movement of supports, tables or carriages for either work pieces or tools.

Aside from the advantages above described in the application of my invention to a milling machine it should be noted that the action of the pressure wedge referred to is a constantly functioning action regardless of the direction of rotation of the driving element. This avoids periods of non-functioning and makes for greater accuracy and precision in the operation and control of the part to which motion is transmitted and is particularly desirable as a precision factor in machine tools. A pronounced advantage is derived from my invention as a measuring device for the accurate positioning or feeding of a carriage table or the like. It provides the advantage of a pre-loaded and constant pressure against one side of the screw and eliminates the very small but objectionable variables introduced by oil films and other conditions when no provision is made for uniform and adequate pressure against the one side of the screw.

It is believed that the principles of my invention will be readily understood by those skilled in this art and, while I have for purpose of illustration shown but a single embodiment as applied to a milling machine it will be apparent from the above disclosure and description that my invention is applicable wherever screw and nut transmission elements are employed, particularly in machine tools.

I claim:

1. In a machine tool, the combination of a cutting tool, a reciprocable work table, a fixed nut, a screw in said nut connected to the table, means for rotating the screw in opposite directions, a supplemental nut on the screw, gear teeth on the periphery of said supplemental nut, a toothed member meshing with said gear teeth, a coiled spring acting between said tooth member and a fixed member tending to impart rotative movement to the supplemental nut, a cam surface on said supplemental nut, and a fixed cam surface against which the cam surface on the nut acts, whereby to produce a force acting against the screw for maintaining its thread against one side of the fixed nut thread.

2. In a milling machine, the combination of a milling cutter, a work support, a screw member and a nut member, one of which is adapted to be rotated in opposite directions to produce feed movement between the milling cutter and the work support in opposite directions, the milling cutter being rotated in one direction only for milling work in opposite directions for normal milling and climb milling, respectively, a supplemental nut on the screw member, means constantly imparting a force rotatively against the supplemental nut, and cam faces acted on by rotation of said supplemental nut for exerting a force against the screw member to cause its thread to bear against one side only of the thread of the nut member at all times when feeding in opposite directions and when reversing from one direction to the other, whereby the screw is maintained against said one side only of the thread of the nut member both when normal milling and climb milling.

3. In a milling machine, the combination set forth in claim 2, including means providing for rotative yielding movement of the supplemental nut while exerting said force to accommodate variances in pitch diameter of the screw member.

4. In a milling machine, the combination of a milling cutter, a reciprocable work table, a screw connected to the table for reciprocating the same, a fixed nut in which the screw turns, means for rotating the screw in one direction for feeding the work table for normal milling and in the opposite direction for climb milling, a fixed member having an inclined face, a supplemental nut on the screw having end thrust in one direction against said inclined face of said fixed member, means for imparting a force rotatively against the supplemental nut in a direction to turn it on the screw with the thrust against said inclined surface whereby to exert a force against the screw for maintaining its thread against one side of the thread of the fixed nut both when normal and climb milling.

5. In a milling machine, the combination of a frame, a rotary milling cutter supported on the frame, a work table supported on the frame for reciprocation in a plane at right angles to the axis of rotation of the milling cutter, a screw member connected to the work table, a nut member on the screw, means for rotating one of said members to propel the work table in feed movements in both directions, the nut member being supported on the frame in such manner as to take the end thrust from propelling the work table as well as the thrust from the milling operations, the milling cutter being rotated only in one direction whereby to produce normal milling when the work table is propelled in one direction and climb milling when propelled in the opposite direction, a supplemental nut on the screw, a member against which the supplemental nut has end thrust when moved in a rotative direction about the screw member, said end thrust member being in fixed relative relation to the first mentioned nut member, means exerting a yielding force against the supplemental nut member in said rotative direction whereby to exert a force against the screw member in a direction to maintain its thread against one side of the thread of the first mentioned nut member when the table is propelled in the direction for climb cutting, said force against the screw member being exerted in the same direction as the travel of the work table when climb cutting.

6. In a milling machine, the combination of a milling cutter, a work support, a screw member and a nut member one of which is adapted to be rotated in opposite directions to produce feed movement between the milling cutter and the work support in opposite directions, the milling cutter being rotated in one direction only for milling work fed in opposite directions for normal milling and climb milling, respectively, a supplemental nut on the screw member having an inclined face, a fixed member having an inclined face complemental to that of the supplemental nut, and means for imparting a force against the supplemental nut rotative about the screw member whereby the action of the inclined face of the supplemental nut against that of the screw member will exert a force against and lengthwise of the screw member in a direction to maintain its thread against one side of the thread of the first mentioned nut member when climb milling, the direction of said force against the screw member being the same as the direction of feed movement when climb milling.

7. In a milling machine, the combination set forth in claim 6, in which the force exerted against the screw member is sufficient to maintain said side of the screw member against said side of the nut member when traversing or approaching the work with respect to the milling cutter in the direction of the climb milling feed.

8. In a milling machine, in combination, a milling cutter, a reciprocable work table, a rotary screw for reciprocating the table, means for rotating the screw in opposite directions, a fixed nut in which the screw operates, a supplemental nut on the screw having a toothed face, a rack member meshing with said toothed face, means urging said rack member to impart rotative movement to the supplemental nut in a given direction, and a fixed cam face against which a cam face on the supplemental nut acts under the influence of said nut rotating means, whereby to impart a thrust against the screw in the same direction as the thrust from the cutter when climb cutting.

9. A back lash remover for motion transmitting elements including a screw, a fixed nut, and an auxiliary nut on the screw, and means including a pressure wedge constantly exerting pressure axially between the nuts, the angle of said wedge serving to cause the auxiliary nut to take up the play of the threads in both nuts and yield to irregularities of the screw thread, said pressure wedge providing an abutment resisting the thrust between the motion transmitting elements for either direction of motion transmission.

10. In combination, a screw, a nut therefor, means causing rotation between said screw and said nut, a supplemental nut for said screw, automatic means acting independently of the first-named means exerting rotative force upon said supplemental nut for changing the distance relation between the said nuts, said automatic means including means whereby said rotative force acts in one direction for either direction of rotation of said first named means, and holding means resisting end thrust between said screw and said nuts in such changed distance relation.

11. In combination, a screw, a nut therefor, means causing rotation in opposite directions between said screw and said nut, a supplemental nut threaded to said screw, means exerting rotative force in one direction only upon said supplemental nut, a cam element acted upon by said force for changing the axial distance between said nuts, and a cooperating cam element to resist end thrust acted on by said last-named means.

12. In means for feeding a machine element, the combination of a screw, a nut therefor, means for causing rotation between the screw and nut, a supplemental nut on the screw, helical means rotative about the screw, means cooperating with said helical means for causing the latter when moved rotatively to exert a force axially thereof causing the said nut and supplemental nut to be held against opposite sides of the screw thread to take up back-lash between the said screw and nut for the transmission of feed motion free from play, means acting on said helical means to cause said force to be applied in one direction when the first-named means is operated for feeding in either one direction or the other, said helical means and said cooperating means being constructed and arranged to compensate by rotative advancement or retraction for variances in the screw thread.

13. In a milling machine, feed mechanism for normal milling and climb milling, including a screw and nut feed, means for causing rotation between said screw and nut, a supplemental nut on the screw, helical means rotative about the screw, means cooperating with said helical means for causing the latter when moved rotatively to exert a force axially thereof causing the said nut and supplemental nut to be held against opposite sides of the screw thread to take up back lash between the said screw and nut for the transmission of feed motion free from play, means acting on said helical means to cause said force to be applied in one direction when the first-named means is operated for feeding in either one direction for normal milling or in the opposite direction for climb milling, said helical means and said cooperating means being constructed and arranged to compensate by rotative advancement or retraction for variances in the screw thread.

14. In a milling machine, mechanism for normal milling and climb milling, including a screw and nut feed, means for causing rotation between the screw and nut to feed in one direction for normal milling and in the opposite direction for climb milling, a supplemental nut on the screw, cam means including a movable cam element arranged to exert force to maintain one of said nuts against one side of said thread and the other nut against the opposite side of said thread to take up back lash in the screw and nut feed, and means acting on said movable cam element for causing said force to be exerted in one direction only when the first-mentioned means is operated for causing said feed in either one direction or the other, said cam means being constructed and arranged so that said movable cam element will compensate by advancement or retraction during the application of said force for variances in the screw thread.

15. Motion transmitting mechanism including a screw and a pair of nut elements, means for causing rotation between the screw and nuts, means including a cam element constructed and arranged to constantly exert pressure axially between the nuts to take up play between said nuts and the screw, the angle of the cam element being such as to cause one of the nuts to yield to irregularities in the pitch of the screw thread, and including means whereby said cam element acts in one direction for either direction of rotation of the first-named means.

16. In means for moving a machine element by relative rotation of a screw and a nut, the combination of a screw, a nut therefor, means for causing rotation between the screw and the nut, a supplemental nut on the screw camming means including a movable camming element arranged to exert a force axially relatively between the nut and the supplemental nut tending to hold them against opposite sides of the screw thread to take up back-lash between said screw and nut for the transmission of motion to said machine element free from play, and means acting on said movable camming element to cause said force to be exerted in one direction when the first-named means is operated for moving the machine element in either one direction or the other.

17. In means for moving a machine element by relative rotation of a screw and a nut, the combination of a screw, a nut therefor, means for causing rotation between the screw and the nut, a supplemental nut on the screw, camming means including a movable camming element arranged to exert a force axially relatively between the nut and the supplemental nut tending to hold them against opposite sides of the screw thread to take up back-lash between said screw and nut for the transmission of motion to said machine element free from play, and means acting on said movable camming element to cause said force to be exerted in one direction when the first-named means is operated for moving the machine element in either one direction or the other, said means being constructed and arranged so that said movable camming element will compensate by advancement or retraction for variances in the pitch of the screw thread.

18. A back-lash remover for motion transmitting elements including a screw, a nut held against axial displacement, means for causing rotation between the nut and the screw, a supplemental nut on the screw, cooperating camming elements constructed and arranged to produce a wedging action axially relatively between the nut and the supplemental nut to take up play between said nuts and the screw thread, means acting through one of the camming elements to cause said wedging action to be exerted in one direction when the first-named means is operated for transmitting motion in either one direction or the other, and said cooperating camming elements being constructed and arranged to compensate in said wedging action between the nut and the supplemental nut for variances in the pitch of the screw thread.

19. A back-lash remover for transmitting motion to a machine element by relative rotation of a screw and a nut in opposite directions, including a supplemental nut on the screw, camming means constructed and arranged to cooperate with said supplemental nut to exert a force axially relatively between the nut and the supplemental nut tending to hold them against opposite sides of the screw thread to take up back-lash between said screw and nut for the transmission of motion to said machine element free from play, and means acting through said camming means to cause said force to be exerted in one direction when the first-named means is operated for moving the machine element in either one direction or the other.

CHARLES B. DE VLIEG.

CERTIFICATE OF CORRECTION.

Patent No. 2,002,991. May 28, 1935.

CHARLES B. De VLIEG.

It is hereby certified that error appears in the heading to the printed specification of the above numbered patent requiring correction as follows: Line 6, for the words "Refiled for abandoned" read Continuation of; page 4, first column, line 72, claim 14, after "exert" insert the article a; and second column, line 26, claim 16, after "screw" insert a comma; and that the said Letters Patent should be read with these corrections therein that the same may conform to the record of the case in the Patent Office.

Signed and sealed this 10th day of September, A. D. 1935.

Leslie Frazer (Seal) Acting Commissioner of Patents.